US012458973B2

(12) United States Patent
Malan et al.

(10) Patent No.: US 12,458,973 B2
(45) Date of Patent: Nov. 4, 2025

(54) SLIDE-HOLDER SUPPORT FOR A MICROSCOPE

(71) Applicant: NTP NANO TECH PROJECTS S.R.L., Sant'Angelo in Vado (IT)

(72) Inventors: Mauro Andrea Malan, Sant'Angelo in Vado (IT); Massimo Galavotti, Sant'Angelo in Vado (IT); Adolfo Carloni, Sant'Angelo in Vado (IT); Gianluca Maroncelli, Sant'Angelo in Vado (IT)

(73) Assignee: NTP NANO TECH PROJECTS S.R.L., Sant'Angelo in Vado (IT)

( * ) Notice: Subject to any disclaimer, the term of this patent is extended or adjusted under 35 U.S.C. 154(b) by 1059 days.

(21) Appl. No.: 17/437,175

(22) PCT Filed: Mar. 2, 2020

(86) PCT No.: PCT/IB2020/051754

§ 371 (c)(1),
(2) Date: Sep. 8, 2021

(87) PCT Pub. No.: WO2020/183284

PCT Pub. Date: Sep. 17, 2020

(65) Prior Publication Data

US 2022/0168746 A1 Jun. 2, 2022

(30) Foreign Application Priority Data

Mar. 13, 2019 (IT) ........................ 102019000003681

(51) Int. Cl.
*B01L 9/00* (2006.01)

(52) U.S. Cl.
CPC ............. *B01L 9/52* (2013.01); *B01L 2200/04* (2013.01); *B01L 2300/0609* (2013.01);
(Continued)

(58) Field of Classification Search
CPC .................. B01L 9/52; B01L 2200/04; B01L 2300/0609; B01L 2300/0822; B01L 2300/123; B01L 2300/168
See application file for complete search history.

(56) References Cited

U.S. PATENT DOCUMENTS

2004/0086868 A1* 5/2004 Parker ...................... B01L 9/52 506/4
2005/0186114 A1* 8/2005 Reinhardt ........ G01N 35/00029 422/65
(Continued)

OTHER PUBLICATIONS

International Search Report and Written Opinion for International Patent Application No. PCT/IB2020/051754, mailed May 6, 2020, 12 Pages.

*Primary Examiner* — Jill A Warden
*Assistant Examiner* — Alex Ramirez
(74) *Attorney, Agent, or Firm* — Armstrong Teasdale LLP

(57) ABSTRACT

A microscope slide-holder support having a plate-shaped body defining an upper body surface, an opposite lower body surface, and a body thickness defined between the upper body surface and the lower body surface is provided. The plate-shaped body has a through opening passing through the plate-shaped body between the upper body surface and the lower body surface, at least one slide seat to removably house a corresponding microscope slide at the upper body surface, and upper removable engagement means for engaging/disengaging the microscope slide to/from the plate-shaped body at a respective slide seat. The microscope slide-holder support has a collection plate coupable to the plate-shaped body for at least partially closing the through opening close to the lower body surface, the collection plate and the through opening being configured to jointly form a collection compartment in the microscope slide-holder support.

14 Claims, 4 Drawing Sheets

(52) U.S. Cl.
CPC . *B01L 2300/0822* (2013.01); *B01L 2300/123* (2013.01); *B01L 2300/168* (2013.01)

(56) References Cited

U.S. PATENT DOCUMENTS

| | | | | |
|---|---|---|---|---|
| 2013/0259773 | A1* | 10/2013 | Kubek | B01L 9/52 422/563 |
| 2016/0299043 | A1* | 10/2016 | Kalra | B01L 7/52 |
| 2017/0122971 | A1 | 5/2017 | Otter et al. | |

* cited by examiner

SLIDE-HOLDER SUPPORT FOR A MICROSCOPE

CROSS-REFERENCE TO RELATED APPLICATIONS

This application is a National Stage Application of International Patent Application No. PCT/IB2020/051754, having an International Filing Date of Mar. 2, 2020, which claims the benefit of priority to Italian Patent Application No. 102019000003681, filed Mar. 13, 2019, each of which are hereby incorporated by reference herein.

FIELD OF THE INVENTION

The present invention relates to a slide-holder support for a microscope. In particular, such a slide holder can be of the type which can be mounted on a movable table a microscope capable of moving such a movable table according to predetermined directions which allow the correct positioning of each slide with respect to a microscope lens each time.

BACKGROUND ART

The technique of placing one or more microscope slides on a specific slide-holder support, which can be removably inserted on a movable table of a microscope, is known.

In other words, such a slide-holder support acts as a mechanical interface between the slide and the movable table.

A quantity of a material to be analyzed by the microscope itself is placed on each slide.

Generally, the slide-holder support is inserted by sliding into a corresponding seat in the movable table.

Slide-holder supports having a plurality of seats for accommodating a corresponding plurality of slides at the same time are known.

The slide-holder support comprises a through opening under the slide or o the plurality of slides in order to allow the illumination of the slide from the opposite side with respect to the microscope lens.

The movable table of the microscope is moved so that each slide is selectively arranged in correspondence with the microscope lens.

This slide-holder support is not free from disadvantages.

Indeed, the material which is placed on the upper surface of the slide can move on the slide itself and even falls off the slide and underneath it.

In this case, such a material is likely to fall through the through opening of the slide-holder support, under the slide-holder support itself, with the risk of reaching the parts of the microscope arranged under the opening and aligned with it, e.g. a lighting device or the microscope lens itself.

This may have negative consequences on the delicate, high-tech parts of the microscope and on the correct functionality of the microscope, e.g. on the optimal visualization of the sample on the slide.

Therefore, the need is felt to provide a slide-holder support which can protect the microscope, or the parts thereof arranged under the slide-holder support, from the risk of fouling or damage caused by material to be analyzed falling from the slides themselves.

SUMMARY OF THE INVENTION

It is the object of the present invention to devise and provide a microscope slide-holder support which allows to satisfy the aforesaid needs and to at least partially overcome the drawbacks described above with reference to the prior art.

In particular, it is a task of the present invention to provide a microscope slide-holder support which allows to protect the parts of the microscope arranged under the slide-holder support in use.

It is another object of the present invention to provide a microscope slide-holder support which, in addition to allowing the protection of the parts of the microscope arranged under the slide-holder support in use, also allows quick and easy maintenance and cleaning.

These and further objects and advantages are achieved by a microscope slide-holder support and an assembly of a microscope slide-holder support and at least one slide, in accordance with the independent claims.

Further objects, solutions, and advantages are present in the embodiments described below and claimed in the dependent claims.

BRIEF DESCRIPTION OF THE DRAWINGS

The invention will be illustrated below by describing some embodiments by way of non-limiting example, with reference to the accompanying drawings, in which.

DETAILED DESCRIPTION

Figure 1:
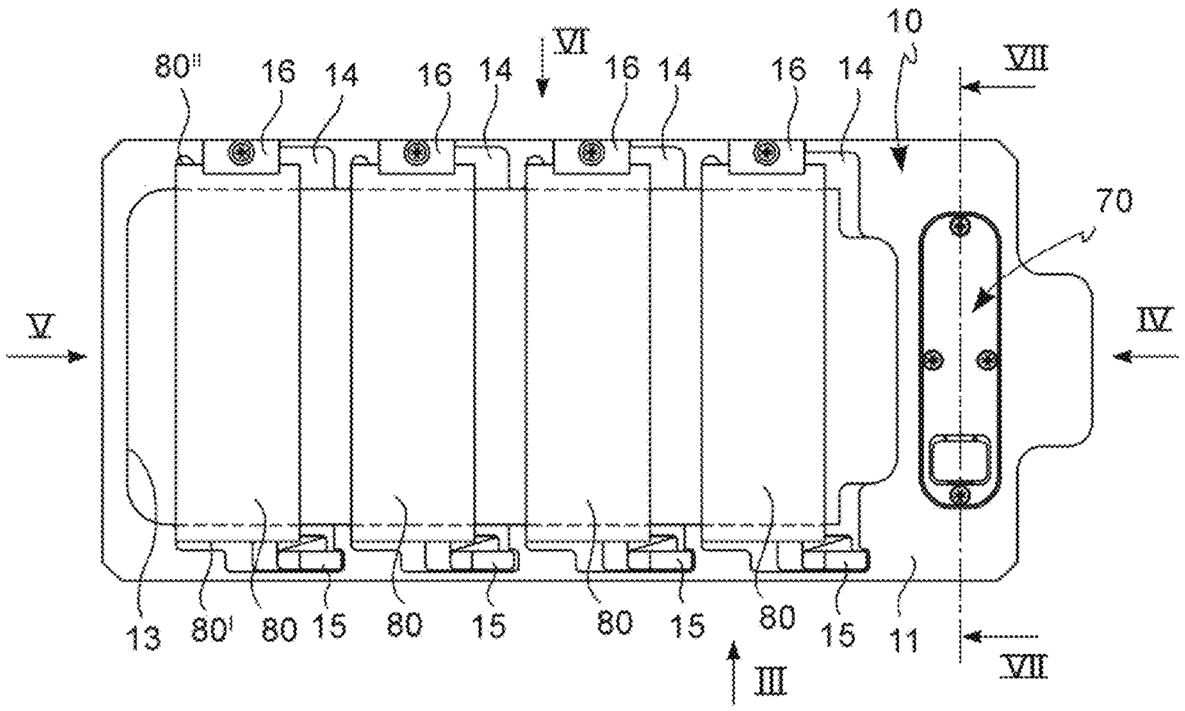
FIG. 1 illustrates an orthogonal top view of a slide-holder support according to the invention.
Figure 2:
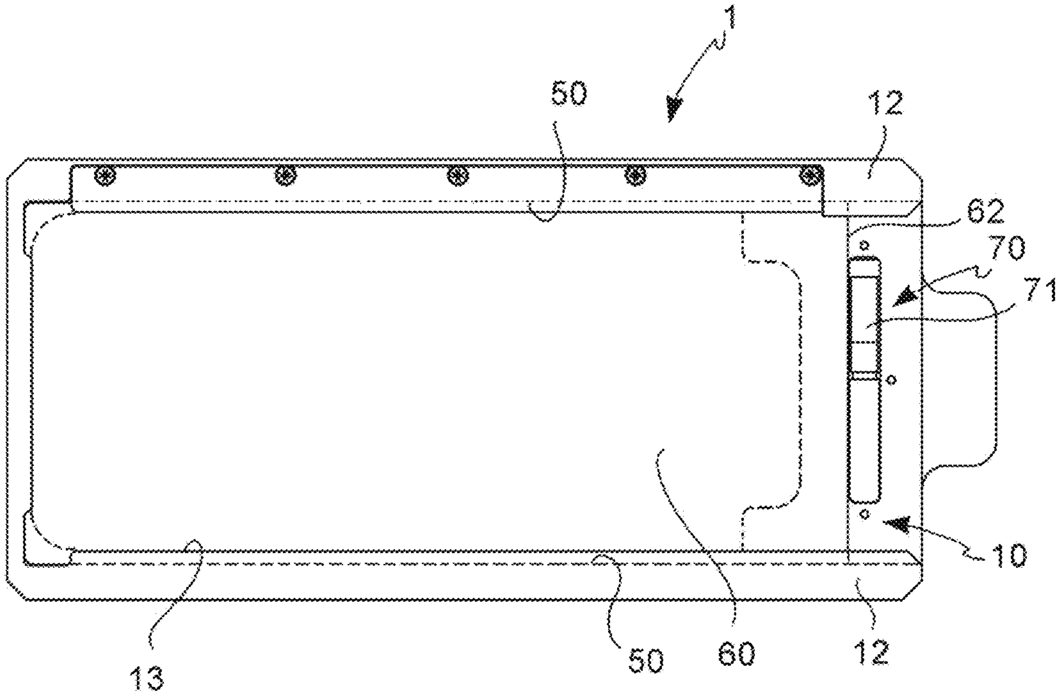
FIG. 2 shows an orthogonal bottom view of the slide-holder support in FIG. 1.
Figure 3:
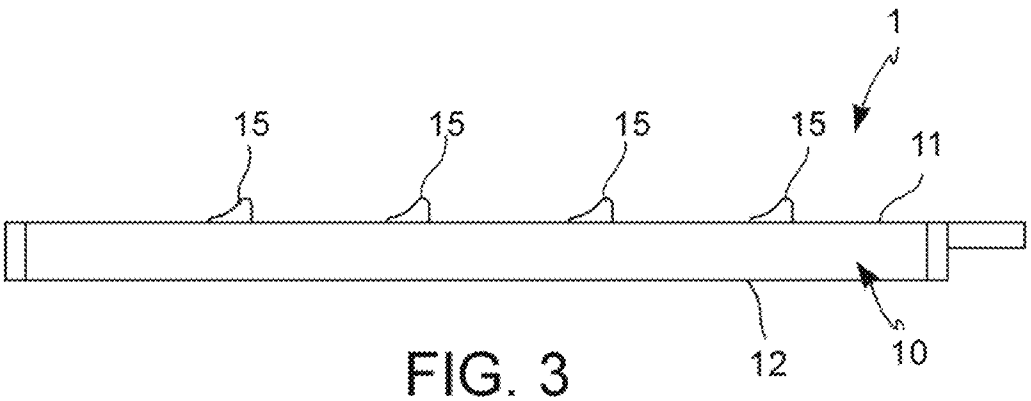
FIG. 3 shows an orthogonal front view of the slide-holder support in FIG. 1.
Figure 4:
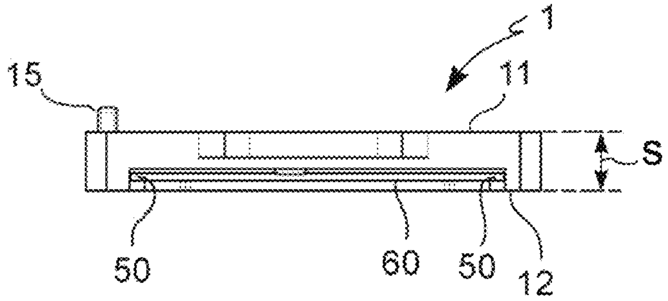
FIG. 4 shows an orthogonal view from the right of the slide-holder support in FIG. 1.
Figure 5:
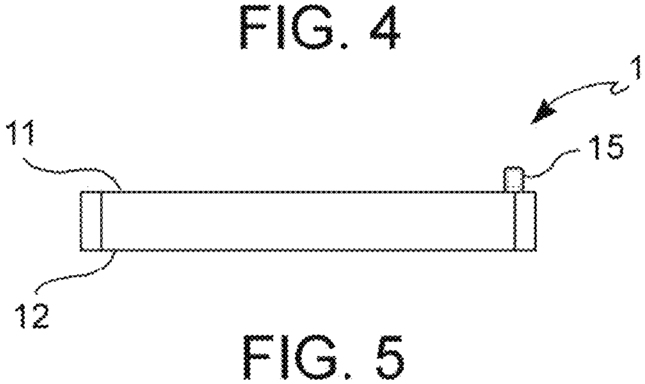
FIG. 5 shows an orthogonal view from the left of the slide-holder support in FIG. 1.
Figure 6:
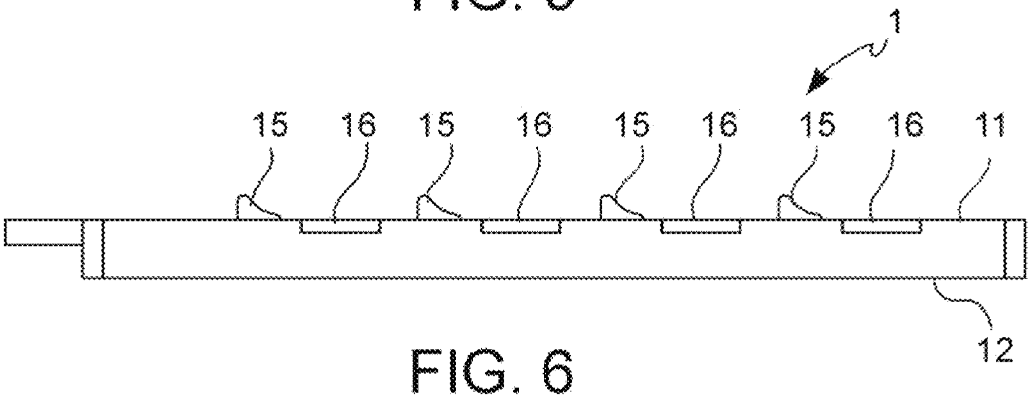
FIG. 6 shows an orthogonal rear view of the slide-holder support in FIG. 1.
Figure 7:
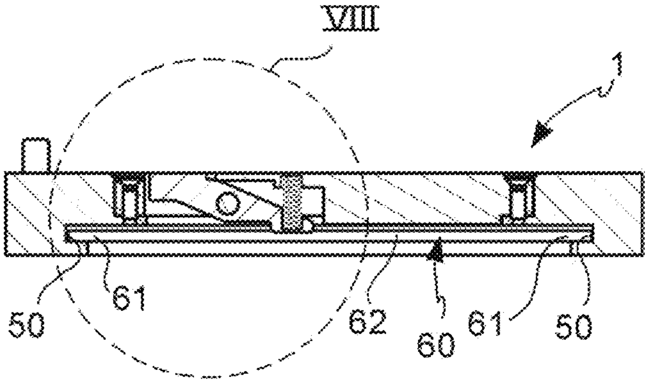
FIG. 7 shows a section view of the slide-holder support in FIG. 1, taken along a section plan VII.
Figure 8:
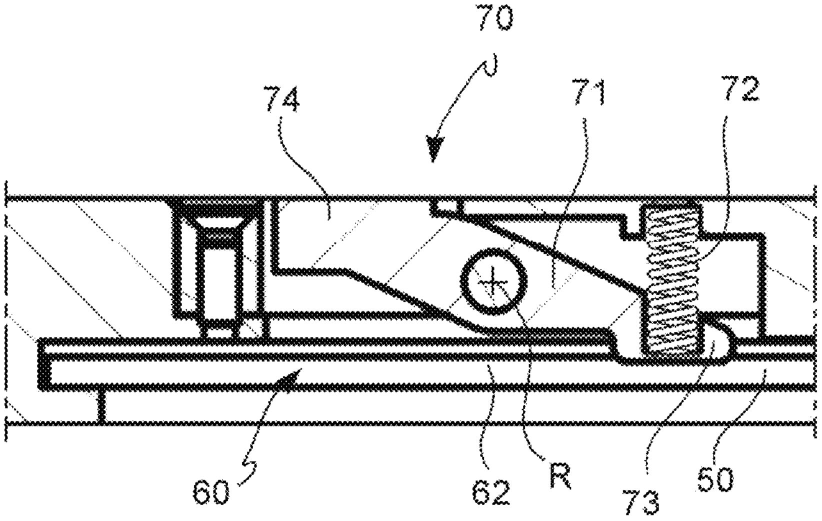
FIG. 8 shows an enlarged detail VIII in FIG. 7.
Figure 9:
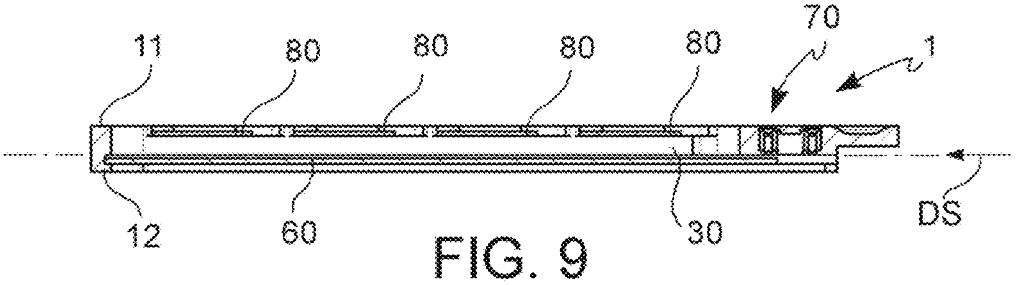
FIG. 9 shows a section view of the slide-holder support in FIG. 10, taken along a section plane IX.
Figure 10:
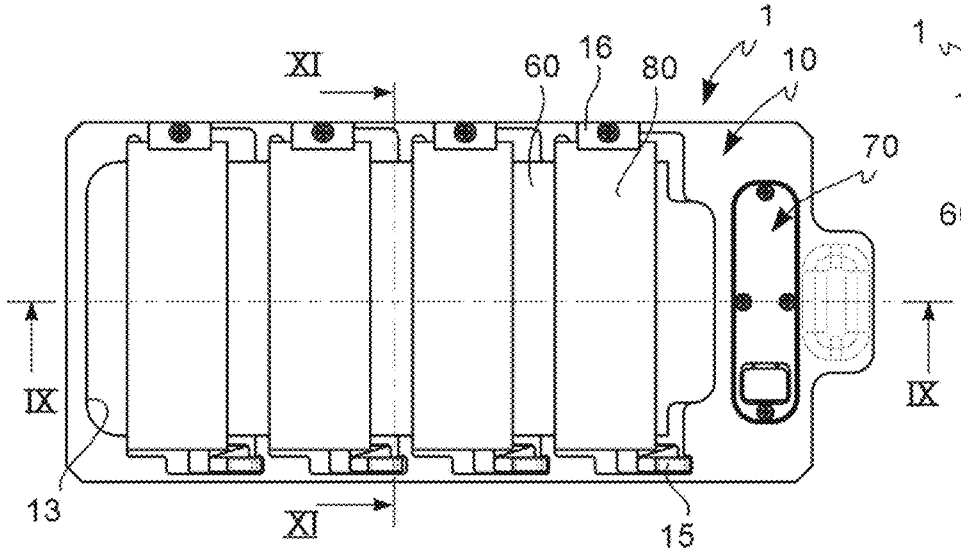
FIG. 10 is an orthogonal top view of the slide-holder support in FIG. 1.
Figure 11:
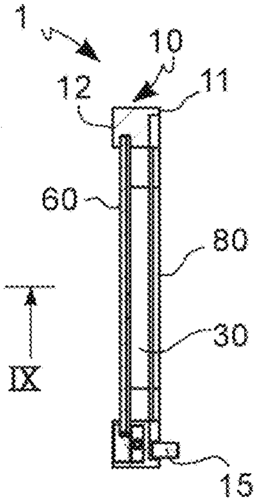
FIG. 11 shows a section view of the slide-holder support in FIG. 10, taken along a section plane XI.
Figure 12:
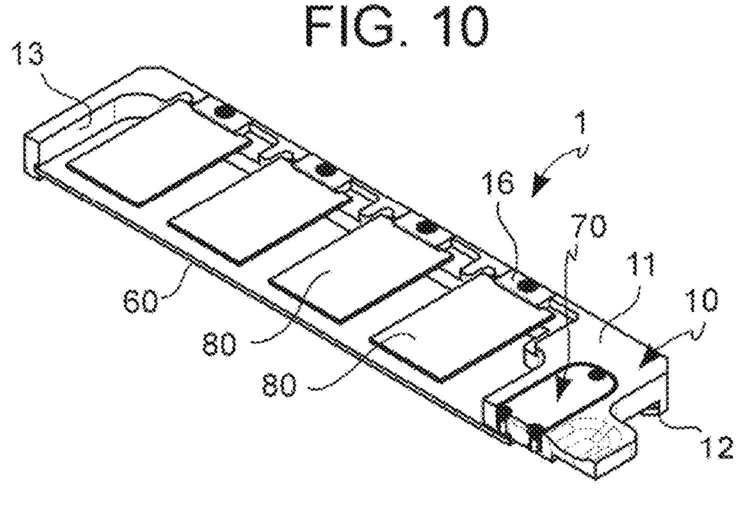
FIG. 12 shows an isometric partial section view of the slide-holder support in FIG. 10, in which one half of the support was removed for the sake of ease of illustration.

A microscope slide-holder support according to the invention shown in the figures and indicated by reference numeral 1 as a whole.

The slide-holder support is adapted to be removably mounted on the movable table of a microscope.

The support is adapted to support one or more microscope slides on which a material to be analyzed can be deposited.

The microscope may comprise moving means of the movable table so as to position the slide in the correct position with respect to the microscope lens.

The slide-holder support comprises a plate-shaped body 10 defining an upper body surface 11, an opposite lower body surface 12, a body thickness S defined between said upper body surface 11 and said lower body surface 12.

The body 10 has a through-opening 13, preferably central, through the body 10 between said upper body surface 11 and said lower body surface 12.

The function of such an opening is to allow light to pass through it to allow the visualization and/or the illumination of a material to be analyzed deposited on the slide 80.

The body 10 has at least one slide seat 14 adapted to removably accommodate a corresponding microscope slide 80 straddling said through-opening 13.

The at least one slide seat 14 is either arranged at or near said upper body surface 11 and must be superimposed, at least partially, on said through opening 13.

The de-holder support 1 comprises upper removable engagement means 15, 16 for engaging/disengaging said at least one microscope slide 80 to/from said body 10 at a respective said at least one slide seat 14.

The slide-holder support 1 further comprises a collection plate 60 configured to be coupled to said body 10 to close at least partially said through opening 13 close to said lower body surface 12, said collection plate 60 and said through opening 13 being configured to jointly form a collection compartment. 30 into said slide-holder support 1.

A purpose of the collection plate is to form a collection chamber inside the body 10, arranged in use below the at least one microscope slide 80.

According to an embodiment, the plate-shaped body 10 comprises a collection plate seat 50 arranged near said lower body surface 12, to accommodate said collection plate 60, preferably in a removable manner.

According to an embodiment, the slide-holder support comprises lower removable engagement means 70 for engaging/disengaging said collection plate 60 to/from said body 10 into said collection plate seat 50.

Such lower removable engagement means allow replacement of the collection plate, e.g. when it is fouled, or when necessary for other reasons.

According to an embodiment, the collection plate 60 is dimensioned to completely close said through opening 13 near said lower body surface 12.

Preferably, the collection plate 60 is configured to form a seal for liquids with said through opening 13 or with said collection plate seat 50.

Thereby, the collection compartment 30 is liquid-tight.

According to an embodiment, the collection plate seat 50 is formed into the body 10.

Thereby, the collection plate prevents any material arranged on the at least one slide 80 from falling under the body 10 through the through opening.

This allows to protect any apparatus operationally arranged under the slide-holder support from being accidentally reached by such materials to be analyzed.

According to an embodiment, the collection plate seat 50 enters into the thickness S of the body starting from said lower body surface 12 according to such a depth to avoid said collection plate 60, in use, from protruding externally with respect to said lower body surface 12.

According to this embodiment, the lower surface of the collection plate 60 is prevented from protruding outwards from the lower body surface 12.

Thereby, the lower body surface 12 protects the bottom surface of the collection plate from the accidental contact with other surfaces.

Thereby, the collection plate is prevented from touching any support surface of the movable table of the microscope table on which the slide-holder support is mounted.

According to another embodiment, the collection plate seat 50 can be arranged, even partially, outside, or protruding, with respect to said lower body surface 12.

In such a case, the collection plate 60 may protrude externally with respect to the lower body surface 12.

Thereby, the volume contained by the collection chamber 30 is increased because its height measured orthogonally to the collection plate is increased.

For example, the collection plate seat 50 can be made in an external element with respect to body 10, e.g. separated from the body 10 and fixed, or fixable, to body 10.

According to an embodiment, the collection plate 60 is made of transparent material, preferably made of glass.

Alternatively, the collection plate 60 may be made of another transparent material, e.g. polymeric material, or Plexiglas.

The transparency of the collection plate allows to illuminate at least one slide by means of a light source arranged on the opposite side of the slide-holder support.

According to an embodiment, the lower body surface 12 is either flat or substantially flat.

According to an embodiment, the collection plate seat 50 is configured to slidingly house the collection plate 60 according to a preset sliding direction DS up to a plate operational position.

According to an embodiment, the predetermined sliding direction DS is parallel to the lower body surface 12.

According to an embodiment, the lower body surface 12 is either flat or substantially flat, and wherein the collection plate 60 is either flat or substantially flat, and wherein the collection plate seat 50 is configured to slide the collection plate 60 parallel to the lower body surface 12.

In other words, the collection plate seat 50 is configured to translate the collection plate 60 parallel to itself and parallel to said lower body surface 12.

The collection plate 60 defines two opposite longitudinal plate edges 61.

According to an embodiment, the collection plate seat 50 comprises two opposite sliding channels 51 facing each other and configured to slidingly accommodate said two opposite longitudinal plate edges 61.

According to an embodiment, the two opposite sliding channels 51 and the two opposite longitudinal plate edges 61 are straight and mutually parallel.

According to an embodiment, the lower removable engagement means 70 comprise a movable engagement element 71 which is movable between an engaged position, in which said engagement element 71 protrudes with respect to said collection plate seat 50 so as to retain said collection plate 60 abutted in an operational position, and a disengaged position, in which said engagement element 71 is retracted with respect to said collection plate seat 50 so as to allow the extraction of the collection plate 60 with respect to the body 10 by sliding the collection plate along the predetermined sliding direction DS.

According to an embodiment, the collection plate 60 defines a transverse plate edge 62, which is transverse to the predetermined sliding direction DS.

In such a case, the movable engagement element 71, in its engaging position, can be configured to hold the transverse plate edge 62.

According to an embodiment, the lower engagement means 70 comprise an elastic element 72 arranged to bias said engagement element 71 towards said engaged position.

According to an embodiment, the engagement element is, or comprises, a first-class lever pivotally engaged to the body 10 about a rotation axis R, or fulcrum, and having a first free engagement end 73 configured to engage said collection plate in abutment in the engaged position, and an opposite free actuation end adapted to be pressed by a user to bring the engagement element 71 into the disengaged position.

The rotation axis R, or fulcrum, is preferably interposed between the first free engagement end 73 and the free actuating end 74.

In other words, the engagement element 71 is preferably a first-class lever.

According to an embodiment, the rotation axis R is arranged either along said sliding direction DS or parallel to said sliding direction DS.

According to an embodiment, the lower removable engagement means 70 are completely contained within the thickness S of the body 10.

Thereby, the lower removable engagement means 70, by not protruding from the body, avoid being an obstacle to the movement of the slide-holder support during its application to the microscope.

According to an embodiment, the at least one microscope slide 80 configured to be removably housed in a corresponding one of said at least one seat 14, straddling said central through opening 13 so that at least one portion of said at least one slide 80 remains overlapping said through opening 13.

According to an embodiment, the at least one slide 80, when engaged in its respective slide seat 14, is substantially parallel to said upper body surface 11, preferably either coplanar or substantially coplanar to said upper body surface 11.

According to an embodiment, the at least one slide is, or comprises, a transparent rectangular flat plate, preferably made of glass.

According to an embodiment, the at least one slide 80 can be engaged in a corresponding one of said at least one slide seat 14, at its short, sides 80', 80".

According to an embodiment, the at least one slide seat 14 enters into the thickness S of the body starting from said upper body surface 11 according to such a depth so as to prevent said at least one microscope slide 80 from protruding externally with respect to said upper body surface 11.

According to an embodiment, the upper body surface is substantially flat, preferably parallel to said lower body surface 12.

According to an embodiment, the upper engagement means 15, 16 comprise an undercut portion 16 at a first end of said slide seat 14 and a movable engagement element 15 at an opposite second end of said slide seat 14.

According to an embodiment, the undercut portion 16 and the movable engagement element 15 are configured to engage opposite short 80' and 80" sides of said at least one slide 80'.

According to an embodiment, the movable engagement 15 is a sliding element.

According to an embodiment, the at least one slide seat 14 is formed by a plurality of slide seats 14, said slide seats 14 being distributed along a preset distribution direction, wherein said preset distribution direction is parallel to said sliding direction DS.

According to an embodiment, the slide seats 14 of said plurality are spaced apart along the predetermined distribution direction DS, so as accommodate a corresponding plurality of microscope slides 80 in a mutually spaced manner.

According to an embodiment, the at least one slide seat. 14 is formed by four slide seats 14.

According to an aspect of the present invention, the aforesaid purposes and advantages are achieved by means of an assembly of a microscope slide-holder support 1 as described above, and at least one microscope slide 80.

The at least one microscope slide 80 is configured to be removably housed in a corresponding one of said at least one seat 14, straddling said central through opening 13 so that at least one portion of said at least one slide 80 remains overlapping said through opening 13.

Those skilled in the art may make changes and adaptations to the embodiments of the device described above or can replace elements with others which are functionally equivalent in order to meet contingent needs without departing from the scope of the following claims. All the features described above as belonging to a possible embodiment may be implemented irrespective of the other described embodiments.

It is worth noting that the figures are not necessarily in scale.

All the features described here may be combined in any combination, except for the combinations in which at least some of such features mutually exclude one another.

The invention claimed is:

1. A microscope slide-holder support, comprising:

a plate-shaped body defining an upper body surface, an opposite lower body surface, a body thickness defined between said upper body surface and said lower body surface, said plate-shaped body comprising a through opening passing through the plate-shaped body between said upper body surface and said lower body surface, said plate-shaped body comprising at least one slide seat configured to removably house a corresponding microscope slide at said upper body surface; and upper removable engagement means for engaging/disengaging the microscope slide to/from said plate-shaped body into said at least one slide seat, wherein the upper removable engagement means comprise an undercut portion at a first end of said slide seat and a movable engagement element at an opposite second end of said slide seat, and wherein the undercut portion and the movable engagement element are configured to engage opposite short sides of the microscope slide; and a collection plate configured to be coupled to said plate-shaped body and is sized to completely close said through opening close to said lower body surface, wherein said collection plate and said through opening being configured to jointly form a collection compartment into said microscope slide-holder support, and wherein said collection plate is made of transparent material, thereby allowing light to pass through and illuminate the microscope slide.

2. The microscope slide-holder support of claim 1, wherein said plate-shaped body comprises a collection plate seat arranged close to said lower body surface to removably house said collection plate; and wherein said microscope slide-holder support further comprises lower removable engagement means for engaging/disengaging said collection plate to/from said plate-shaped body into said collection plate seat.

3. The microscope slide-holder support of claim 2, wherein the collection plate seat is formed into the plate-shaped body.

4. The microscope slide-holder support of claim 3, wherein the collection plate seat enters into the body thickness of the plate-shaped body starting from said lower body surface according to such a depth to prevent said collection plate, in use, from protruding externally with respect to said lower body surface.

5. The microscope slide-holder support of claim 2, wherein the collection plate seat is configured to slidingly house the collection plate according to a preset sliding direction up to an operating position.

6. The microscope slide-holder support of claim 5, wherein the preset sliding direction is parallel to the lower body surface.

7. The microscope slide-holder support of claim 5, wherein said at least one slide seat is formed by a plurality of slide seats, said plurality of slide seats being distributed along a preset distribution direction, wherein said preset distribution direction is parallel to said preset sliding direction.

8. The microscope slide-holder support of claim 5, wherein the lower removable engagement means comprise a movable engagement element that is movable between an engaged position, in which said movable engagement element protrudes with respect to said collection plate seat to retain abutted said collection plate in the operating position, and a disengaged position, in which said movable engagement element is retracted with respect to said collection plate seat to allow extraction of the collection plate with respect to the plate-shaped body.

9. The microscope slide-holder support of claim 8, wherein the movable engagement element is a lever pivotally engaged to the plate-shaped body about a rotation axis and having a first free engagement end configured to engage in abutment said collection plate in the engaged position, and an opposite free actuation end configured to be pressed by a user to bring the movable engagement element into the disengaged position.

10. The microscope slide-holder support of claim 9, wherein the rotation axis is parallel to said preset sliding direction.

11. The microscope slide-holder support of claim 8, wherein the lower removable engagement means comprise an elastic element configured to affect said movable engagement element towards said engaged position.

12. The microscope slide-holder support of claim 2, wherein the lower removable engagement means are completely contained within the body thickness of the plate-shaped body.

13. The microscope slide-holder support of claim 1, wherein said collection plate is made of glass.

14. An assembly of a microscope slide-holder support and of at least one microscope slide, comprising:

a microscope slide-holder support comprising:

a plate-shaped body defining an upper body surface, an opposite lower body surface, a body thickness defined between said upper body surface and said lower body surface; said plate-shaped body comprising a through opening passing through the plate-shaped body between said upper body surface and said lower body surface, said plate-shaped body comprising at least one slide seat configured to removably house a corresponding at least one microscope slide at said upper body surface; and upper removable engagement means for engaging/disengaging said at least one microscope slide to/from said plate-shaped body into said at least one slide seat, wherein the upper removable engagement means comprise an undercut portion at a first end of said slide seat and a movable engagement element at an opposite second end of said slide seat;

wherein the undercut portion and the movable engagement element are configured to engage opposite short sides of said at least one microscope slide; and a collection plate configured to be coupled to said plate-shaped body and is sized to completely close said through opening close to said lower body surface, wherein said collection plate and said through opening being configured to jointly form a collection compartment into said microscope slide-holder support; and wherein said collection plate is made of transparent material, thereby allowing light to pass through and illuminate the at least one microscope slide, and said at least one microscope slide is configured to be removably housed in a corresponding one of said at least one seat, straddling said through opening so that at least one portion of said at least one microscope slide remains overlapping said through opening.

* * * * *